(12) United States Patent
Park et al.

(10) Patent No.: US 11,445,579 B2
(45) Date of Patent: Sep. 13, 2022

(54) WIRELESS INDUCTION HEATING COOKER AND WIRELESS INDUCTION HEATING SYSTEM COMPRISING THE SAME

(71) Applicant: LG Electronics Inc., Seoul (KR)

(72) Inventors: Byungkyu Park, Seoul (KR); Hyeunsik Nam, Seoul (KR); Wan Soo Kim, Seoul (KR)

(73) Assignee: LG Electronics Inc., Seoul (KR)

(*) Notice: Subject to any disclaimer, the term of this patent is extended or adjusted under 35 U.S.C. 154(b) by 275 days.

(21) Appl. No.: 16/902,436

(22) Filed: Jun. 16, 2020

(65) Prior Publication Data
US 2021/0204369 A1    Jul. 1, 2021

(30) Foreign Application Priority Data

Dec. 30, 2019  (KR) .................... 10-2019-0177866

(51) Int. Cl.
*H05B 6/12* (2006.01)
*A47J 36/06* (2006.01)
(Continued)

(52) U.S. Cl.
CPC ............ *H05B 6/1209* (2013.01); *A47J 36/06* (2013.01); *A47J 36/16* (2013.01); *A47J 36/32* (2013.01);
(Continued)

(58) Field of Classification Search
CPC . A47J 36/06; A47J 36/16; H02J 50/40; H05B 6/12–1209; H05B 6/129; H05B 6/1245; H05B 6/1227
See application file for complete search history.

(56) References Cited

U.S. PATENT DOCUMENTS

| 5,386,102 A | * | 1/1995 | Takikawa | ............. | H05B 6/1227 |
| | | | | | 219/652 |
| 5,512,733 A | * | 4/1996 | Takikawa | ............. | H05B 6/1227 |
| | | | | | 219/622 |

(Continued)

FOREIGN PATENT DOCUMENTS

| JP | 2010262865 | 11/2010 |
| JP | 2013054951 | 3/2013 |

(Continued)

OTHER PUBLICATIONS

PCT International Search Report in International Appln. No. PCT/KR2020/00416, dated Sep. 28, 2020, 9 pages.

*Primary Examiner* — Michael A Laflame, Jr.
(74) *Attorney, Agent, or Firm* — Fish & Richardson P.C.

(57) ABSTRACT

A wireless induction heating cooker is configured to be operated on an induction heating apparatus. The wireless induction heating cooker includes a main body, a lid that is configured to be coupled to an upper surface of the main body and that includes an output module, an internal pot configured to be disposed within the main body, a plurality of temperature sensors that are disposed at an outer surface of the internal pot and that are arranged along a circumferential direction of the internal pot, and a control module. The control module is configured to determine an alignment state of the main body relative to the induction heating apparatus based on measured values of the plurality of temperature sensors, and control the output module to output a guide signal corresponding to the alignment state.

20 Claims, 15 Drawing Sheets

(51) Int. Cl.
*A47J 36/16* (2006.01)
*A47J 36/32* (2006.01)

(52) U.S. Cl.
CPC ......... *H05B 6/1218* (2013.01); *A47J 2202/00* (2013.01); *H05B 2213/06* (2013.01)

(56) References Cited

U.S. PATENT DOCUMENTS

| | | | | |
|---|---|---|---|---|
| 2014/0348987 | A1* | 11/2014 | Cheng | A23L 5/13 99/331 |
| 2015/0272385 | A1* | 10/2015 | Wang | H05B 6/06 219/627 |
| 2016/0073820 | A1* | 3/2016 | Alet Vidal | H05B 3/746 99/341 |
| 2016/0258104 | A1 | 9/2016 | James | |
| 2018/0063892 | A1* | 3/2018 | Metz | H05B 6/06 |

FOREIGN PATENT DOCUMENTS

| | | |
|---|---|---|
| JP | 5943770 | 7/2016 |
| JP | 2019018067 | 2/2019 |
| JP | 2019097854 | 6/2019 |
| WO | WO2018207441 | 11/2018 |

\* cited by examiner

RELATED ART

RELATED ART

Circumferential Direction

WIRELESS INDUCTION HEATING COOKER AND WIRELESS INDUCTION HEATING SYSTEM COMPRISING THE SAME

CROSS-REFERENCE TO RELATED APPLICATION

This application claims priority to and the benefit of Korean Patent Application No. 10-2019-0177866, filed on Dec. 30, 2019, the disclosure of which is incorporated herein by reference in its entirety.

TECHNICAL FIELD

The present disclosure relates to a wireless induction heating system that enables a user to align a wireless induction heating cooker relative to a working coil of an induction heating apparatus.

BACKGROUND

Various types of cooking devices may use a method of wireless induction heating. For example, an induction heating apparatus may heat an object using a magnetic field generated by the induction heating apparatus rather than heating the object using heat generated in the heating apparatus.

In some examples, the method for heating an object using a magnetic field may be carried out by an induction heating apparatus and a cooker. Specifically, based on electromagnetic induction between the induction heating apparatus and the cooker, power may be transmitted from the induction heating apparatus to the cooker, and the power transmitted to the cooker may heat and cook an object in the cooker.

In some cases, a working coil in the induction heating apparatus and a power reception coil in the cooker may be magnetically coupled with a high coupling coefficient. The working coil and the power reception coil may be aligned for induction heating.

FIGS. 1A and 1B illustrate an example of an operation method of a wireless induction heating cooker in related art.

Referring to FIG. 1A, the induction heating cooker 1 of the related art includes a cooking unit 10 and a power unit 20. An internal pot 60 is accommodated in an internal pot accommodation part 14 in the cooking unit 10, and an induction heating coil 15 for heating the internal pot 60 is provided at a lower portion of the internal pot accommodation part 14. A power reception coil 16, which receives power to be supplied to the induction heating coil 15 from the power unit 20, is provided on a bottom surface of a main body 12 of the cooking unit 10.

The power unit 20 includes a power supply coil 23 disposed to face the power reception coil 16 for a magnetic coupling with the power reception coil 16. In this case, to align the power reception coil 16 and the power supply coil 23, a main body lock 17 that fixes the cooking unit 10 and the power unit 20 mutually is provided at the main body 12 of the cooking unit 10.

Referring to FIG. 1B, the induction heating cooker 1 of the related art includes a cooking unit 10C where the power reception coil 16 is fixedly disposed and a power unit 20C where the power supply coil 23 is fixedly disposed are physically fixed through a main body lock 17 to align the power supply coil 23 serving as a working coil and the power reception coil 16 serving as a reception coil.

In some cases, the cooking unit 10 may be operated only on the power unit 20 having a specific structure. For instance, when the cooking unit 10 is operated on another induction heating apparatus other than the power unit 20, alignment between the power reception coil 16 and the working coil may not be ensured. Thus, cooking performance may be deteriorated.

In some cases, an induction heating apparatus and a wireless induction heating cooker may be separately provided. Accordingly, a user may align the wireless induction heating cooker at a proper position on the induction heating apparatus manually to cook an object subject to cooking.

In some cases, the wireless induction heating cooker may be partially aligned or misaligned on the working coil the induction heating apparatus.

In some cases, due to the misalignment between the apparatuses, the object subject to cooking in the wireless induction heating cooker may not be completely cooked or may be overheated depending on its position.

SUMMARY

The present disclosure is directed to a wireless induction heating system that may determine whether a wireless induction heating cooker is aligned on an induction heating apparatus.

The present disclosure is also directed to a wireless induction heating system that may inform a user about an alignment state of a wireless induction heating cooker with respect to an induction heating apparatus.

The present disclosure is also directed to a wireless induction heating system that may inform a user about a direction in which a wireless induction heating cooker is moved and about a distance moved by the wireless induction heating cooker for alignment in case the wireless induction heating cooker is misaligned on an induction heating apparatus.

Aspects of the present disclosure are not limited to the above-described ones. Additionally, other aspects and advantages that have not been mentioned may be clearly understood from the following description and may be more clearly understood from implementations. Further, it will be understood that the aspects and advantages of the present disclosure may be realized via means and combinations thereof that are described in the appended claims.

According to one aspect of the subject matter described in this application, a wireless induction heating cooker is configured to be operated on an induction heating apparatus. The wireless induction heating cooker includes a main body, a lid that is configured to be coupled to an upper surface of the main body and that includes an output module, an internal pot configured to be disposed within the main body, a plurality of temperature sensors that are disposed at an outer surface of the internal pot and that are arranged along a circumferential direction of the internal pot, and a control module. The control module is configured to determine an alignment state of the main body relative to the induction heating apparatus based on measured values of the plurality of temperature sensors, and control the output module to output a guide signal corresponding to the alignment state.

Implementations according to this aspect may include one or more of the following features. For example, the plurality of temperature sensors may include three or more temperature sensors. In some examples, the lid may be hinge-coupled to the main body and configured to open and close the main body. In some examples, the lid may be configured to be attached to and detached from the main body.

In some implementations, the plurality of temperature sensors may be arranged symmetrically with respect to a reference line extending to one of the plurality of the temperature sensors. In some implementations, radial distances between a center of the internal pot and the plurality of temperature sensors are equal to one another. In some implementations, the internal pot may include a round portion that extends upward from a bottom surface of internal pot, where the plurality of temperature sensors are arranged at an outer surface of the round portion of the internal pot.

In some implementations, vertical distances between a bottom surface of the internal pot and the plurality of temperature sensors are equal to one another. In some implementations, central angles defined about a center of the internal pot between any two adjacent temperature sensors of the plurality of temperature sensors may be equal to one another.

In some implementations, the control module may be configured to determine whether the alignment state corresponds to an aligned state or a misaligned state based on a difference in the measured values of the plurality of temperature sensors. In some implementations, the control module may be configured to control the output module to output the guide signal indicating a guide distance and a guide direction relative to the induction heating apparatus that are determined based on a difference in the measured values of the plurality of temperature sensors.

In some implementations, the guide signal may include a sound signal determined by the control module.

In some implementations, the guide signal may include screen information determined by the control module. In some examples, the output module may be configured to output the screen information including a guide distance and a guide direction relative to the induction heating apparatus. In some examples, the guide direction in the screen information may include an arrow-shaped graphical object having a length determined based on the guide distance.

According to another aspect, a wireless induction heating system includes an induction heating apparatus configured to generate a magnetic field through a working coil, and a wireless induction heating cooker that is configured to be operated on the induction heating apparatus and that includes an internal pot, and a plurality of temperature sensors that are arranged on an outer surface of the internal pot along a circumferential direction of the internal pot. The wireless induction heating cooker is configured to determine an alignment state of the wireless induction heating cooker relative to the induction heating apparatus based on measured values of the plurality of temperature sensors, and transmit alignment information corresponding to the alignment state to the induction heating apparatus. The induction heating apparatus includes a light-emitting module that is configured to output a guide light pattern indicating the alignment state based on the alignment information received from the wireless induction heating cooker.

Implementations according to this aspect may include one or more of the following features. For example, the alignment information may include a guide distance and a guide direction relative to the induction heating apparatus that are determined based on a difference in the measured values of the plurality of temperature sensors.

In some examples, the alignment information may include a guide distance and a guide direction relative to the induction heating apparatus, and the light-emitting module may be arranged about the working coil and configured to output the guide light pattern corresponding to the guide distance and the guide direction relative to the induction heating apparatus.

In some implementations, the light-emitting module may include a plurality of light-emitting elements that are arranged along a circumferential direction of the working coil, and the induction heating apparatus may be configured to output the guide light pattern through at least one of the plurality of light-emitting elements corresponding to the guide direction.

In some implementations, the light-emitting module may be configured to adjust a radial length of the guide light pattern based on the guide distance. In some examples, the light-emitting module may be configured to increase the radial length of the guide light pattern based on an increase of the guide distance.

In some implementations, the wireless induction heating system may determine an alignment state based on measured values of at least three temperature sensors disposed in parallel on an outer surface of an internal pot along a circumferential direction of the internal pot, thereby making it possible to determine whether a wireless induction heating cooker is aligned on an induction heating apparatus.

In some implementations, the wireless induction heating system may output a guide signal corresponding to an alignment state through a wireless induction heating cooker or may output guide light corresponding to an alignment state through an induction heating apparatus, thereby making it possible to inform a user about an alignment state of the wireless induction heating cooker with respect to the induction heating apparatus.

In some implementations, the wireless induction heating system may output a guide signal indicating a guide distance and a guide direction through a wireless induction heating cooker or may output guide light indicating a guide distance and a guide direction through an induction heating apparatus. It may be possible to inform a user about a direction in which the wireless induction heating cooker is moved and about a distance moved by the wireless induction heating cooker for alignment between the apparatuses in case the wireless induction heating cooker is misaligned on the induction heating apparatus.

In some implementations, the wireless induction heating system may determine whether a wireless induction heating cooker is aligned on an induction heating apparatus. It may be possible to determine misalignment of a wireless induction heating cooker that causes a deterioration of cooking performance on its own without a user's recognition.

In some implementations, the wireless induction heating system may inform a user about an alignment state of a wireless induction heating cooker with respect to an induction heating apparatus. It may enable the user to realign the wireless induction heating cooker and help to prevent a deterioration of cooking performance caused by misalignment of the wireless induction heating cooker.

In some implementations, the wireless induction heating system may inform a user about a direction in which a wireless induction heating cooker is moved and about a distance moved by the wireless induction heating cooker for alignment in case the wireless induction heating cooker is misaligned on an induction heating apparatus. It may enable the user to easily align the wireless induction heating cooker and significantly improving convenience and usability.

Detailed effects of the present disclosure are described together with the above-described effects in the detailed description of the disclosure.

DETAILED DESCRIPTION

Figure 1A:
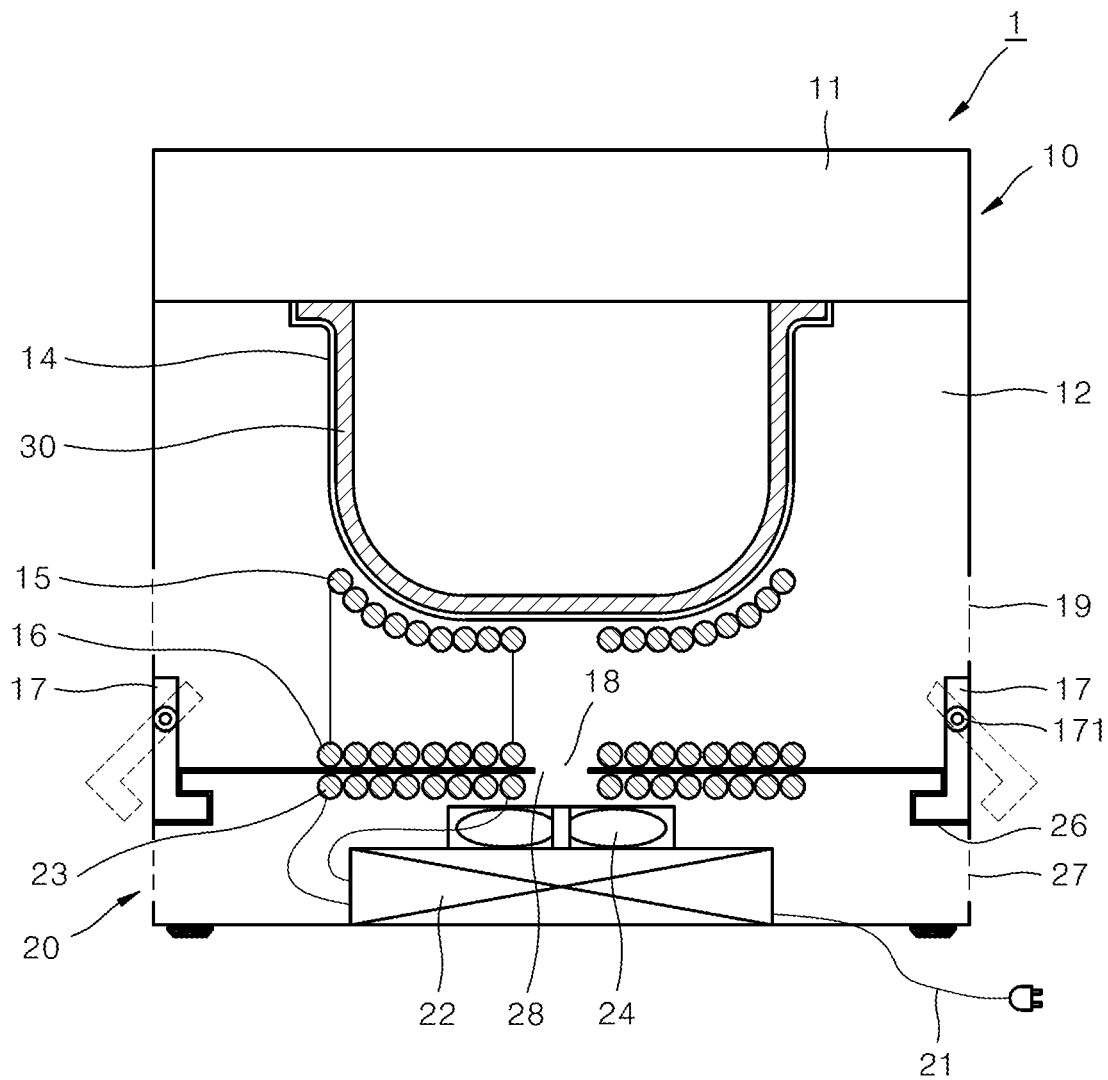
FIG. 1A and FIG. 1B are views illustrating examples of an induction heating cooker in related art.
Figure 1B:
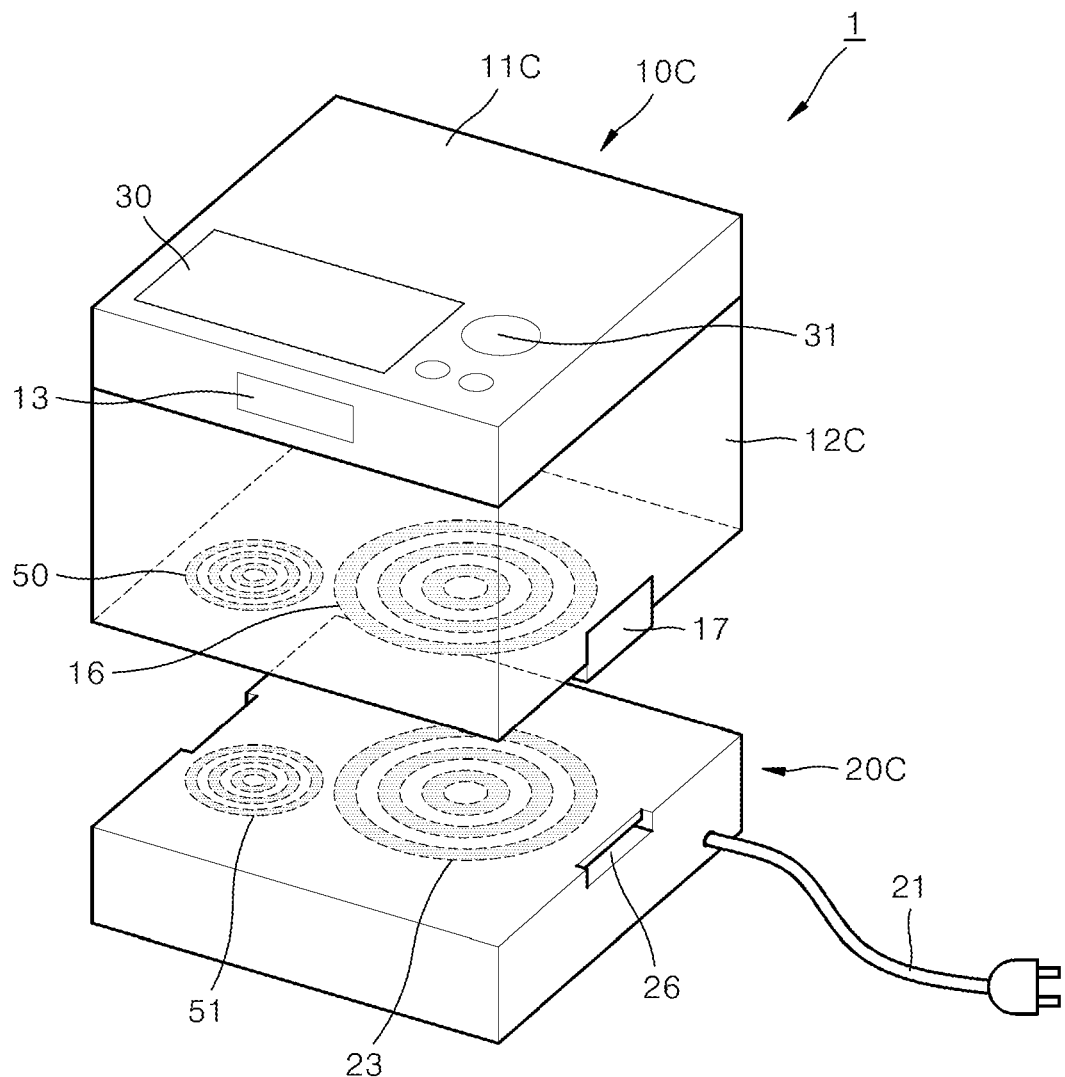

The above-described aspects, features and advantages are specifically described with reference to the accompanying drawings hereunder such that one having ordinary skill in the art to which the present disclosure pertains may easily implement the technical spirit of the disclosure. Below, one or more implementations of the present disclosure are specifically described with reference to the accompanying drawings. Throughout the drawings, identical reference numerals denote identical or similar components.

The present disclosure relates to a wireless induction heating system that enables a user to align a wireless induction heating cooker on a working coil of an induction heating apparatus.

Below, an exemplary wireless induction heating system, and a wireless induction heating cooker and an induction heating apparatus included in the wireless induction heating system are described with reference to FIGS. 2 to 12.

Figure 2:
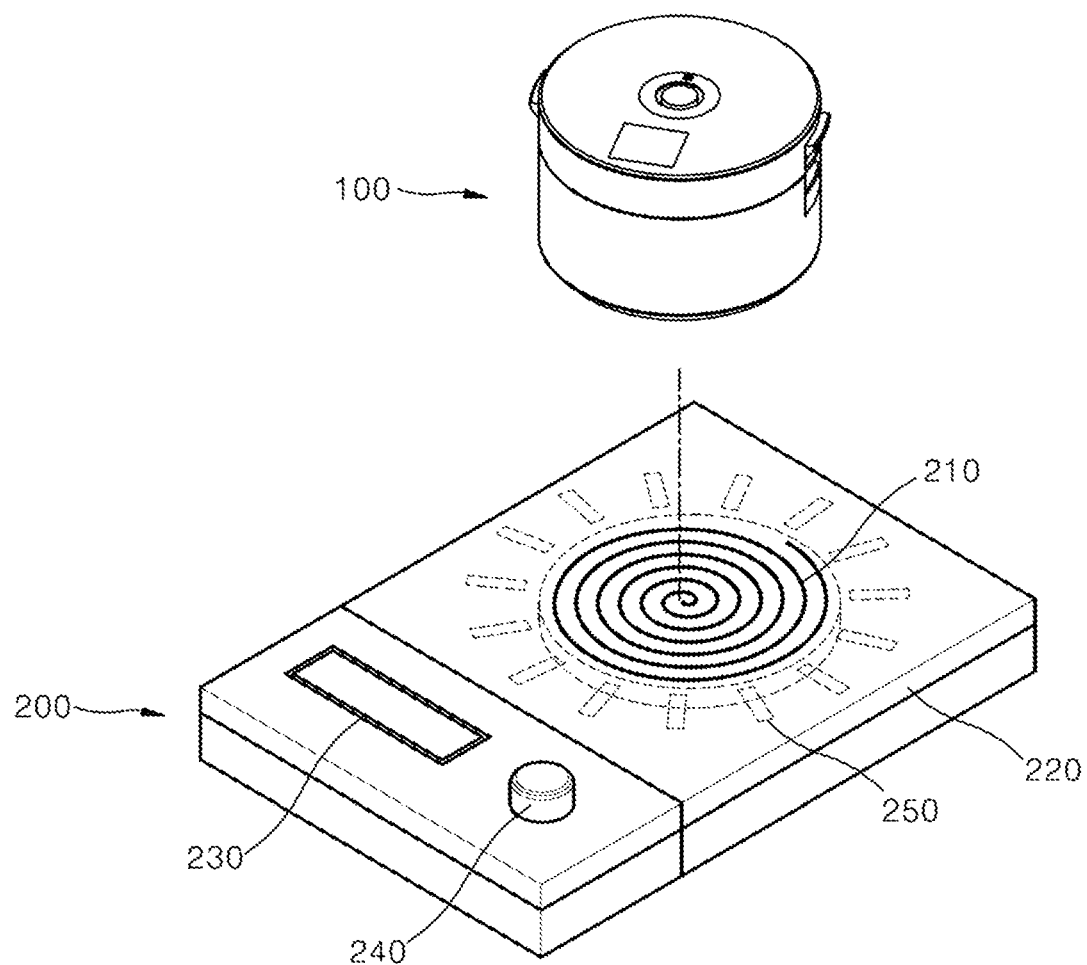
FIG. 2 is a view illustrating an example of a wireless induction heating system.
Figure 3:
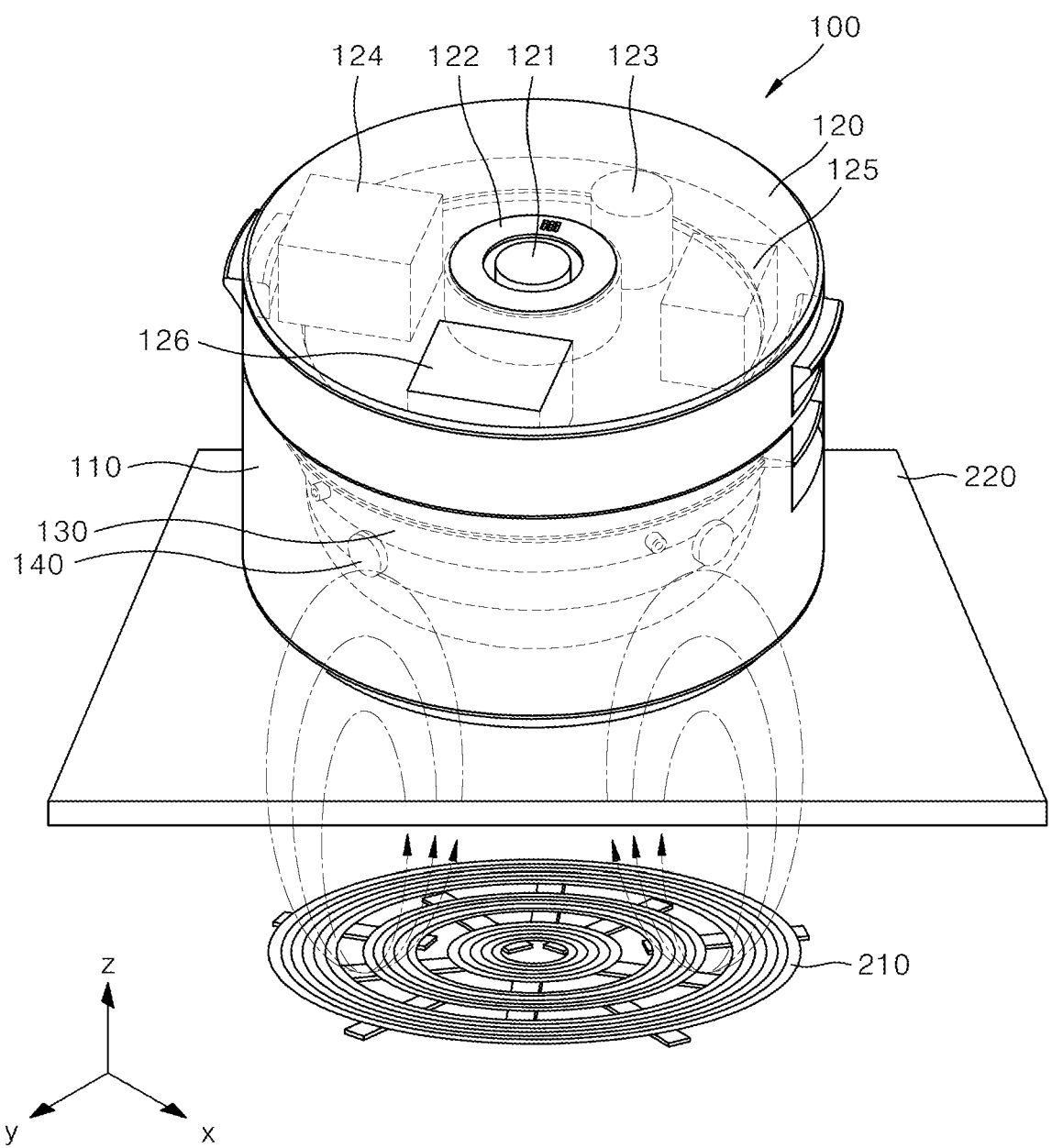
FIG. 3 is a view illustrating the wireless induction heating cooker in FIG. 2 disposed on an example of an induction heating apparatus.

FIG. 2 is a view illustrating an example of a wireless induction heating system, and FIG. 3 is a view illustrating the wireless induction heating cooker in FIG. 2 operating on an example of an induction heating apparatus.

Figure 4:
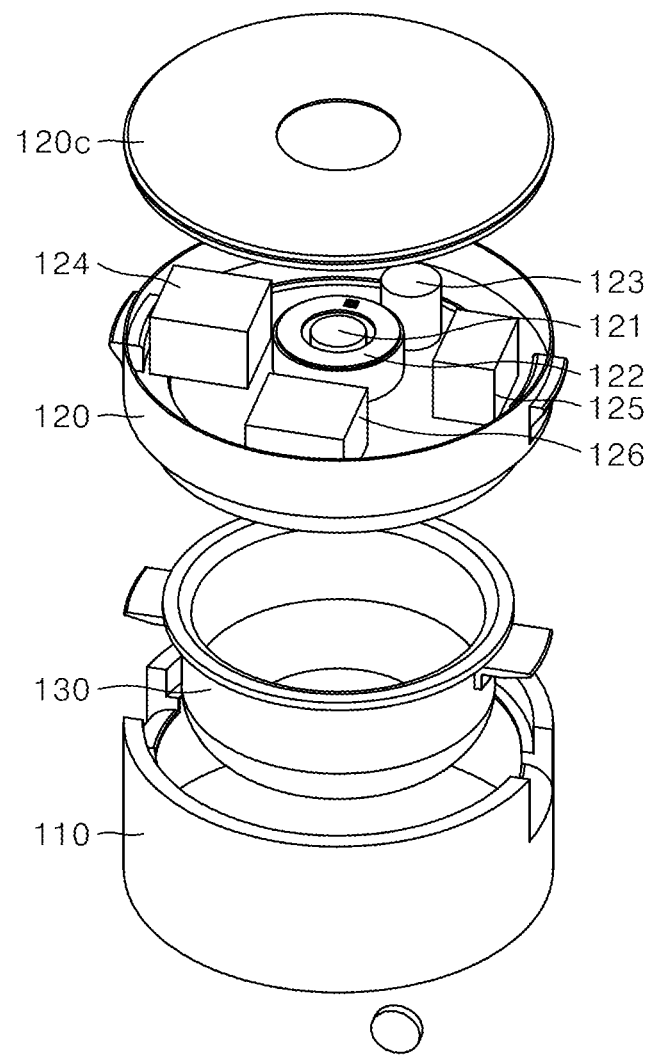
FIG. 4 is an exploded view illustrating the wireless induction heating cooker in FIG. 3.
Figure 4:
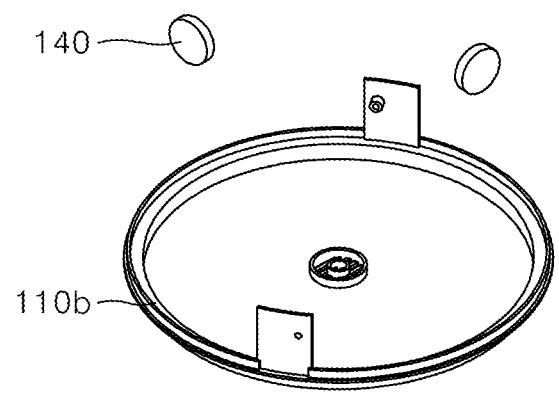

FIG. 4 is an exploded view illustrating the wireless induction heating cooker in FIG. 3.

Figure 5:
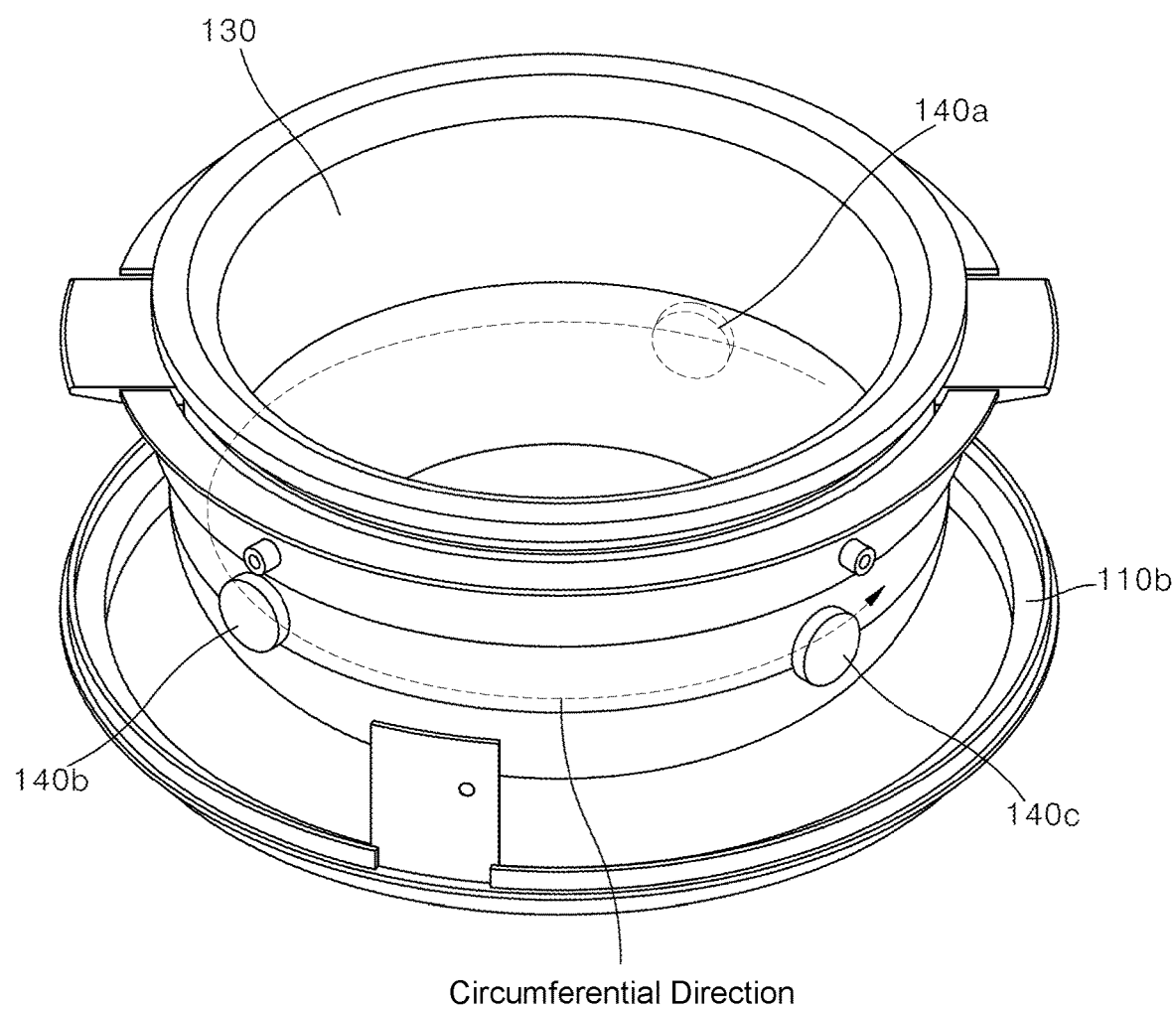
FIG. 5 is a view illustrating an example of an internal pot and three temperature sensors disposed on an outer surface of the internal pot.
Figure 6:
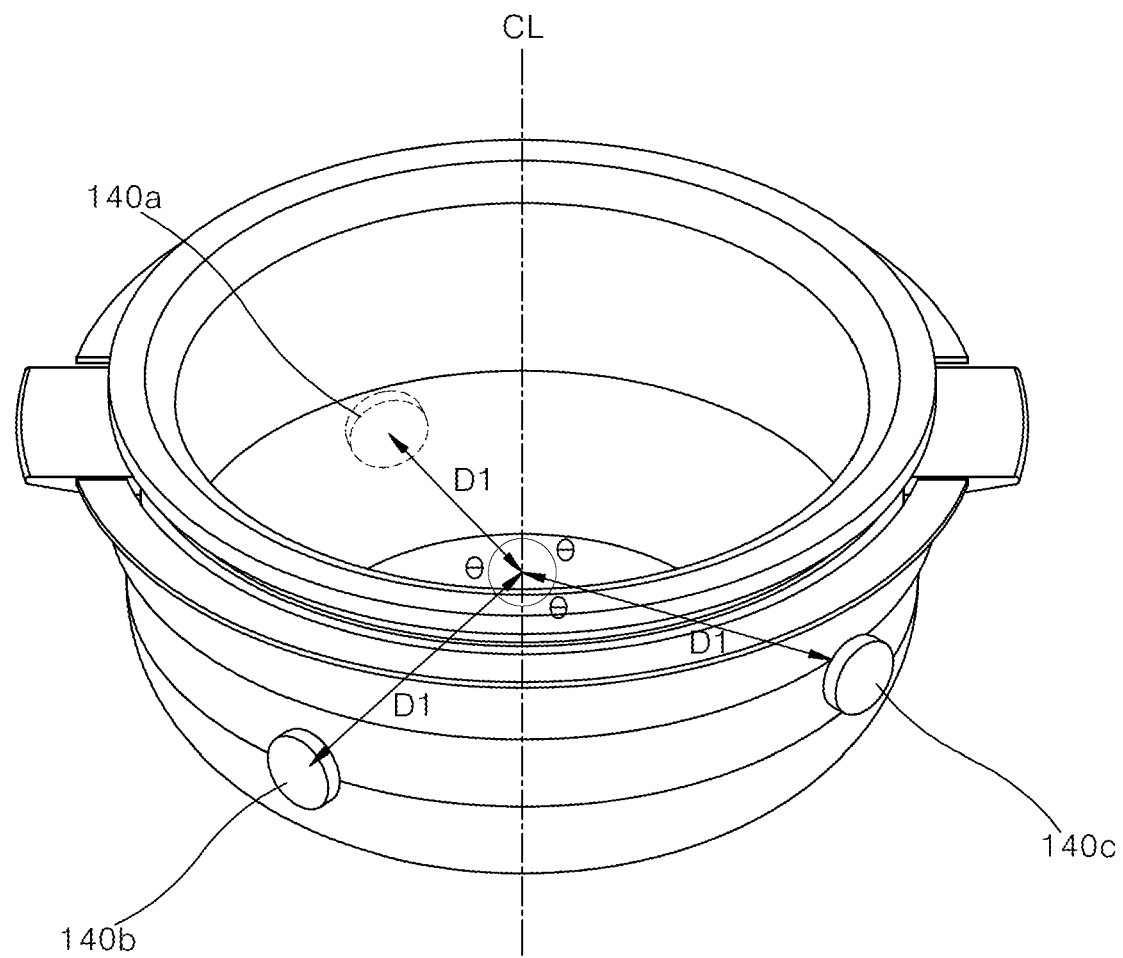
FIG. 6 is a view illustrating an example of a relative positioning relationship of a plurality of temperature sensors.

FIG. 5 is a view illustrating an example of an internal pot and a plurality of temperature sensors that are disposed on an outer surface of the internal pot, and FIG. 6 is a view illustrating a relative positioning relationship of the plurality of temperature sensors.

Figure 7:
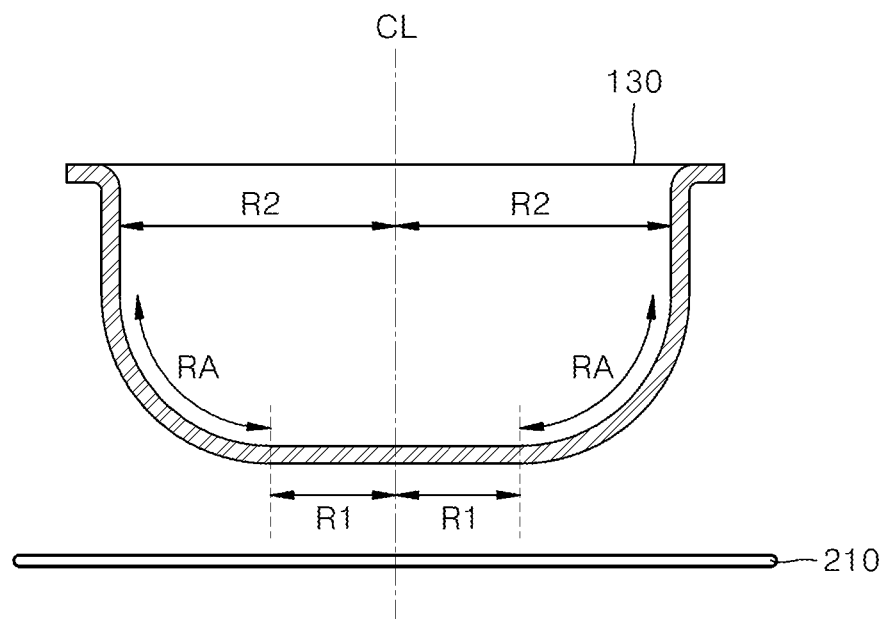
FIG. 7 is a view illustrating an example of a round area of an internal pot.
Figure 8:
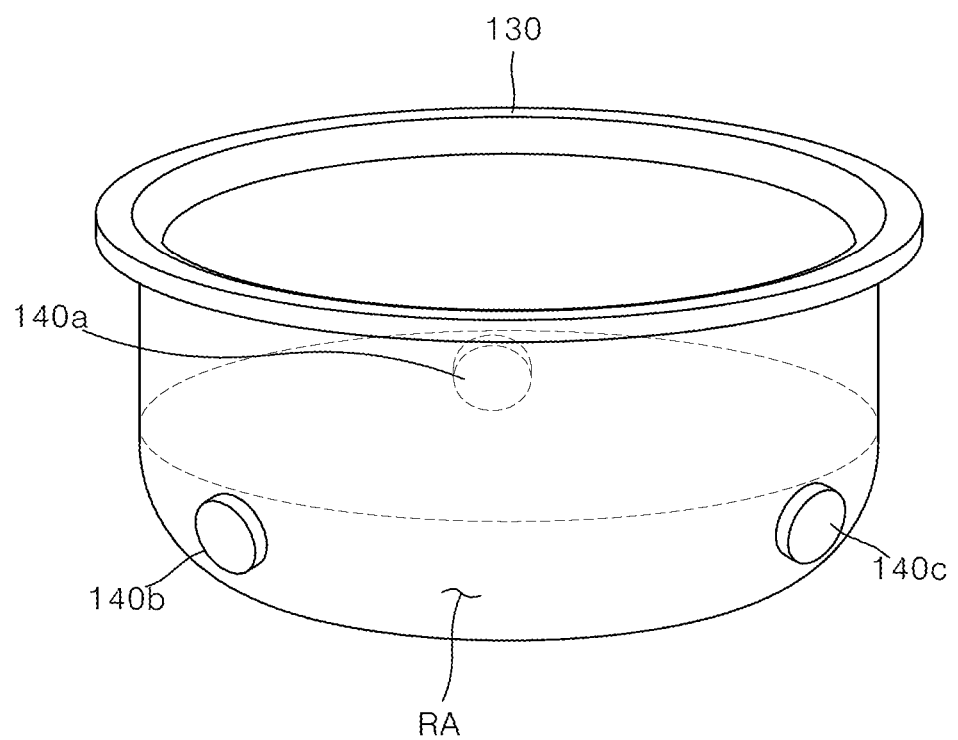
FIG. 8 is a view illustrating an example of temperature sensors disposed at the round area in FIG. 7.

FIG. 7 is a view illustrating an example a round area of an internal pot, and FIG. 8 is a view illustrating an example of temperature sensors disposed at the round area in FIG. 7.

Figure 9:
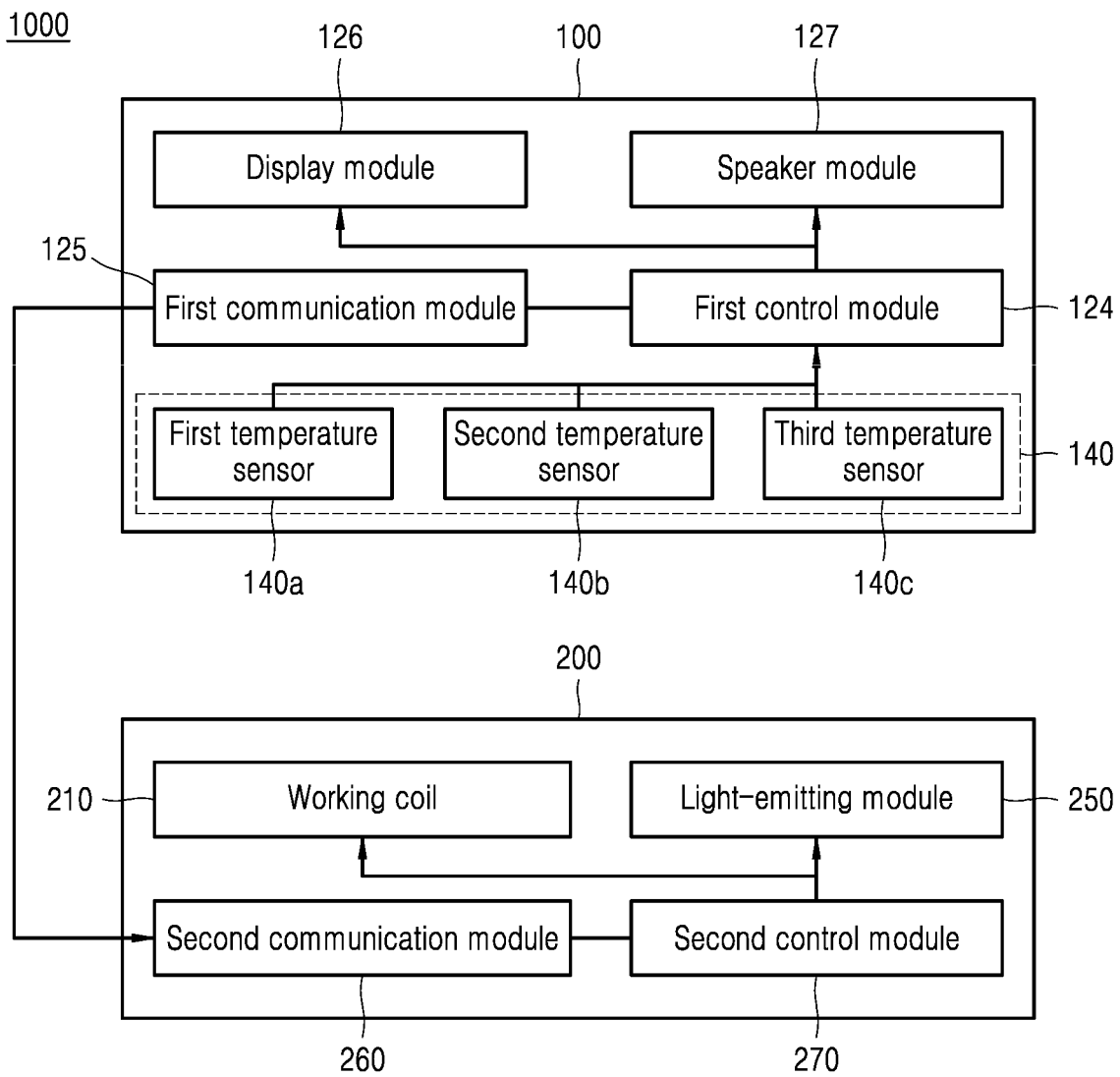
FIG. 9 is a view illustrating an example of a control flow of the wireless induction heating system in FIG. 2.

FIG. 9 is a view illustrating an example of a control flow of the wireless induction heating system in FIG. 2.

Figure 10A:
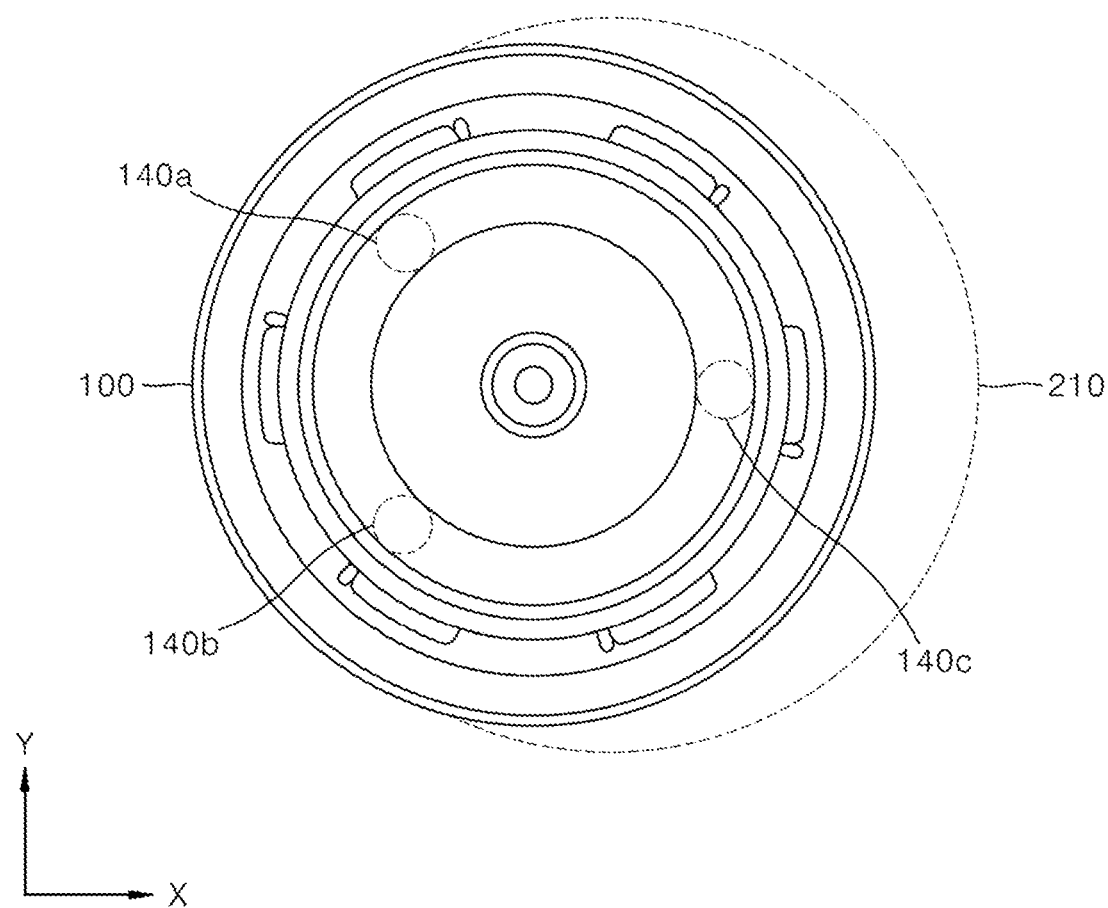
FIGS. 10A and 10 B are views illustrate example operations of a wireless induction heating cooker that is partially aligned or misaligned with a working coil.
Figure 10B:
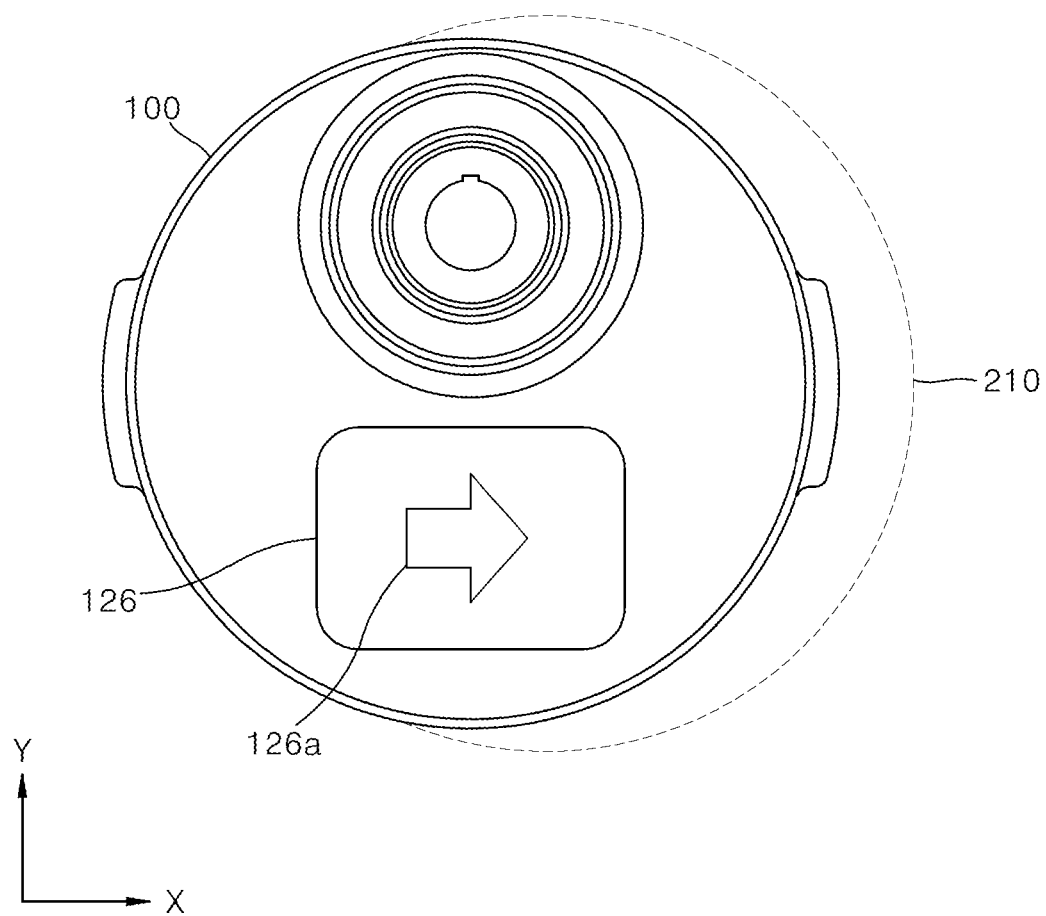

FIGS. 10A and 10B are views illustrating example operations of a wireless induction heating cooker when the wireless induction heating cooker is partially aligned or misaligned with a working coil.

Figure 11A:
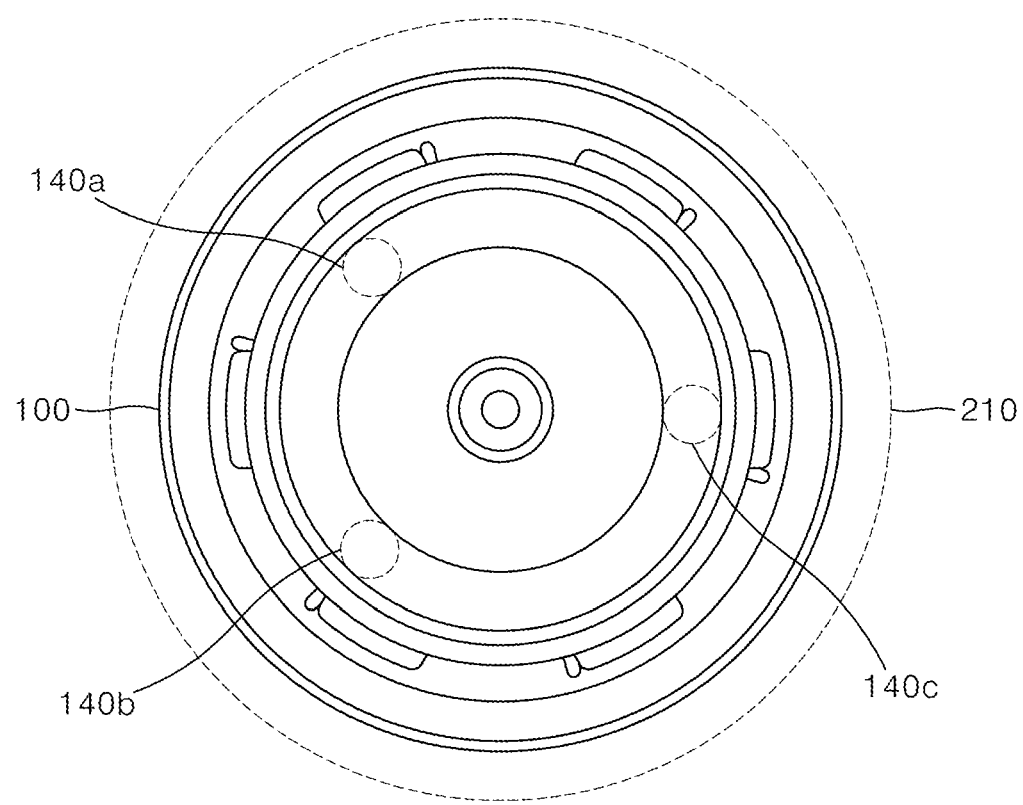
FIGS. 11A and 11 B are views illustrate example operations of an induction heating apparatus when a wireless induction heating cooker is aligned with a working coil.
Figure 11B:
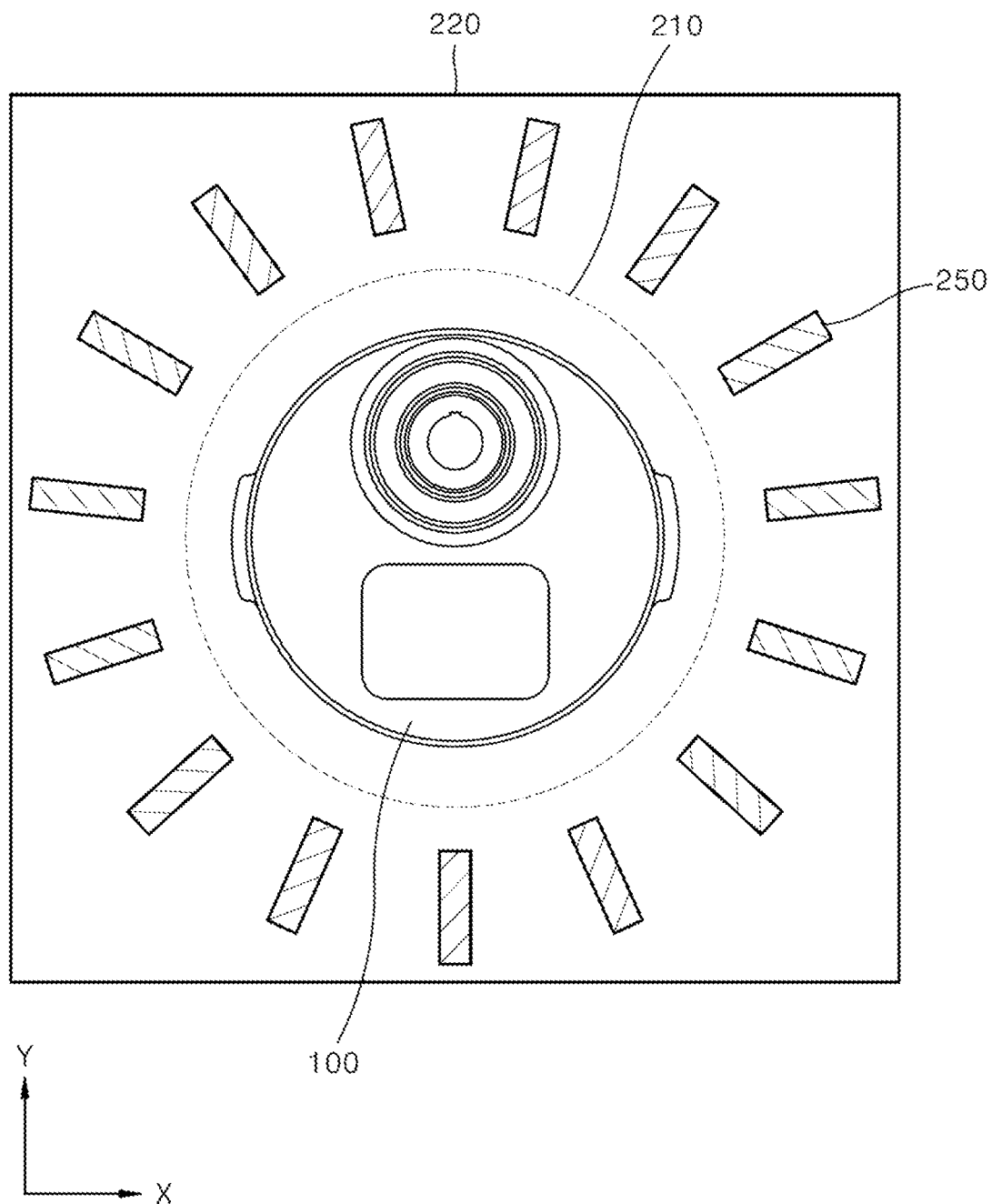
Figure 12:
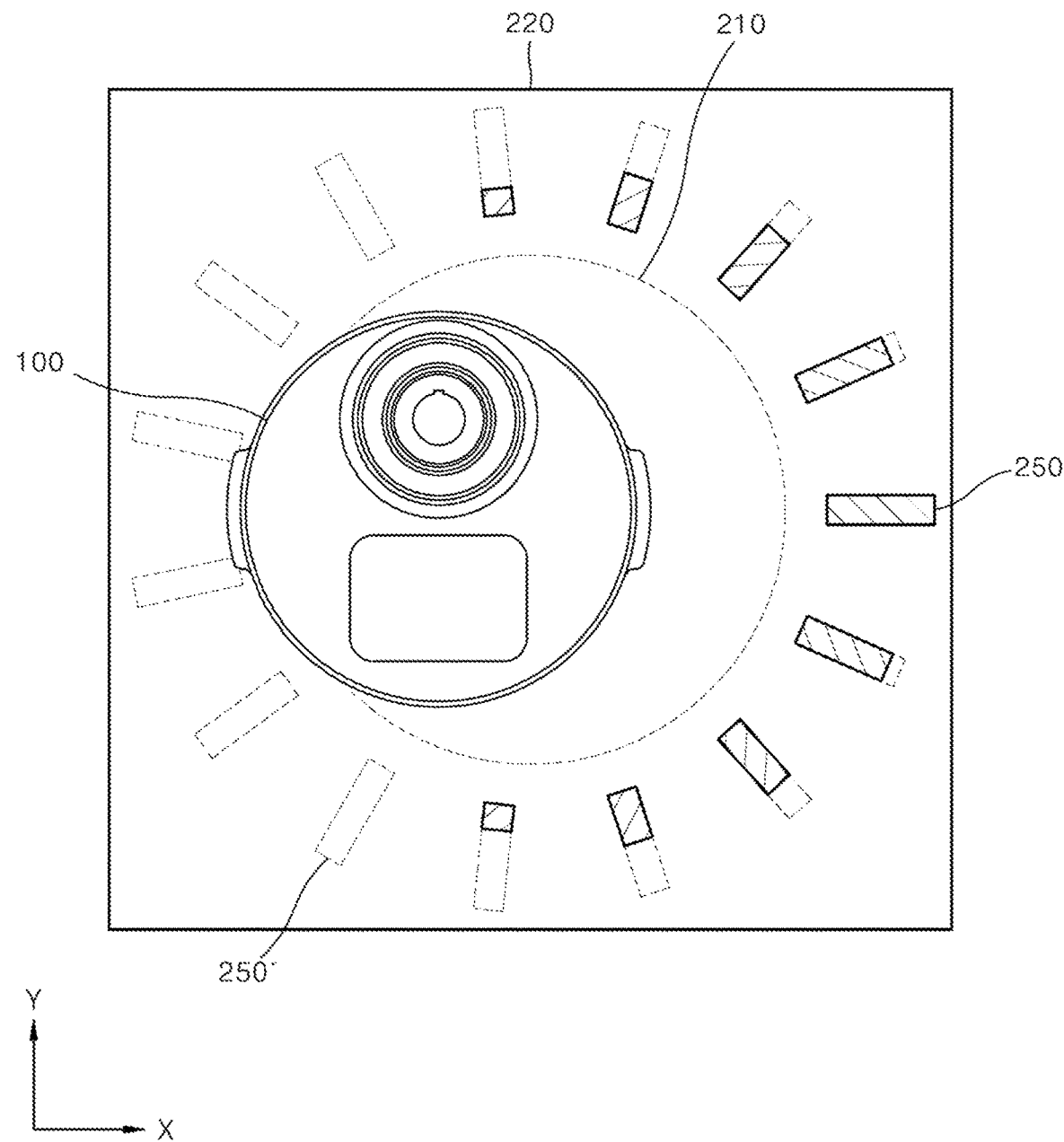
FIG. 12 is a view illustrating example operations of an induction heating apparatus when a wireless induction heating cooker is partially aligned or misaligned with a working coil as in FIG. 10A.

FIGS. 11A and 11B are views illustrating example operations of an induction heating apparatus when a wireless induction heating cooker is aligned with a working coil. FIG. 12 is a view illustrating example operations of an induction heating apparatus when a wireless induction heating cooker is partially aligned or misaligned with a working coil as shown in FIG. 10A.

In some implementations, referring to FIG. 2, a wireless induction heating system 1000 may include a wireless induction heating cooker 100 and an induction heating apparatus 200. The wireless induction heating cooker 100 and the induction heating apparatus 200 in FIG. 2 are provided as examples. Additionally, the wireless induction heating cooker 100 and the induction heating apparatus 200 may be implemented as any form that may perform below-described operations.

The wireless induction heating cooker 100 may perform a cooking operation through the method of electromagnetic induction. For example, the wireless induction heating cooker 100 may operate on the induction heating apparatus 200.

Specifically, the wireless induction heating cooker 100 may operate on an upper plate of an induction heating apparatus 200 including a working coil 210. The wireless induction heating cooker 100 may be placed at a position corresponding to or vertically above the working coil 210. Electric currents may flow through the working coil 210 by control of the induction heating apparatus 200. Accordingly, a magnetic field may be generated in the working coil 210. The magnetic field generated in the working coil 210 may heat an internal pot 130 in the wireless induction heating cooker 100, and an object subject to cooking stored in the internal pot 130 may be heated and cooked.

In some implementations, the induction heating apparatus 200 may include a display 230, and state information of the induction heating apparatus 200 may be output to the display 230. Further, the induction heating apparatus 200 may include a knob switch 240, and an output from the working coil 210 may be determined based on a degree to which the knob switch 240 is rotated. Operations of the induction heating apparatus 200 according to the disclosure are described hereunder.

Below, a structure of the wireless induction heating cooker 100 is described with reference to FIGS. 3 to 8.

In some implementations, referring to FIGS. 3 and 4, the wireless induction heating cooker 100 may include a main body 110, a lid 120, an internal pot 130 and at least three temperature sensors 140. The lid 120 may include a steam discharge module 121, a noise reduction module 122, a pressure weight 123, a control module 124, a communication module 125 and an output module (e.g., a display module 126 and a speaker module 127), therein. For instance, the output module may include at least one or a display or a speaker.

The wireless induction heating cooker 100 in FIGS. 3 and 4 is provided according to an implementation, and components of the wireless induction heating cooker 100 are not limited to those of the implementation in FIGS. 3 and 4. For instance, some components may be added, modified or removed in other implementations.

The main body 110 may be or include a case that supports a lower portion and a lateral portion of the wireless induction heating cooker 100. In some examples, the main body 110 may have a cylinder shape in which an upper portion is opened and a lower portion is sealed by a bottom surface 110*b*. The internal pot 130 is placed in the main body 110, and various types of grain such as rice may be stored, heated and cooked in the internal pot 130.

The lid 120 may be or include a case that is configured to seal an upper portion of the wireless induction heating cooker 100. The lid 120 may be coupled to the opened upper surface of the main body 110, and the upper surface may be sealed by a lid cover 120*c*. For example, the lid 120 may be coupled to the upper portion of the main body 110 such that the lid 120 is opened and closed with respect to the upper surface of the main body 110.

In some implementations, the lid 120 may be hinge-coupled to the main body 110 and may be optionally opened and closed. The lid 120 may be coupled to a hinge shaft provided at an edge of one surface of the upper portion of the main body 110, and may swivel around the hinge shaft to be optionally opened and closed with respect the upper surface of the main body 110.

In some implementations, the lid 120 may be attached to and detached from the upper surface of the main body 110. For example, the lid 120 may be coupled to the upper surface of the main body 110 by a plurality of couplers provided at an edge of the upper portion of the main body 110. In this case, the lid 120 may be completely detached from the main body 110 such that the lid 120 is easily cleaned.

In some implementations, the lid 120 may include a control module 124 that controls entire operations of the wireless induction heating cooker 100, a communication module 125 that performs data communication with the induction heating apparatus 200, and an output module (e.g., a display module 126 and a speaker module 127 and the like) that outputs state information of the wireless induction heating cooker 100 visually or acoustically, therein. In some examples, the lid 120 may further include a battery for supplying power to the above-described control module 124, communication module 125 and output module and the like.

The control module 124, the communication module 125, and the output module may be implemented as a physical component that includes a printed circuit board (PCB) including a plurality of integrated circuits (IC).

For example, the control module 124, the communication module 125, and the output module may include at least one physical component of application specific integrated circuits (ASICs), digital signal processors (DSPs), digital signal processing devices (DSPDs), programmable logic devices (PLDs), field programmable gate arrays (FPGAs), processors, controllers, micro-controllers, or microprocessors.

In some implementations, the lid 120 may include a pressure weight 123 for constantly maintaining pressure in the wireless induction heating cooker 100, and a steam discharge module 121 (e.g., a solenoid valve) for discharging steam in the wireless induction heating cooker 100 outwards based on a control signal provided by the control module 124. Furthermore, the lid 120 may be provide with a noise reduction module 122 that includes a plurality of sound absorption members for reducing noise when steam is discharged.

The internal pot 130 may have a shape corresponding to a shape of an inner space of the main body 110 and may be stored in the main body 110. For example, in case the main body 110 has a cylinder shape, the internal pot 130 may have a cylinder shape in which an upper surface is opened. The internal pot 130 may be heated by a magnetic field generated in a working coil 210 of the induction heating apparatus 200.

When the wireless induction heating cooker 100 is placed on an upper portion of the induction heating apparatus 200 as illustrated in FIG. 3, the working coil 210 and a lower surface of the internal pot 130 may be placed to face each other with the bottom surface 110*b* of the main body 110 therebetween. A magnetic field generated in the working coil 210 may induce electric currents to the internal pot 130, and Joule's heat may be generated in the internal pot 130 by the induced currents.

For generation of induced currents, the internal pot 130 may be made of any material having magnetic properties. The internal pot 130, for example, may be made of cast iron including iron (Fe), or clad in which iron (Fe) and stainless steel and the like are welded. Though not illustrated in the drawings, the internal pot 130 may be further provided with a metallic plate that is heated by a magnetic field generated in the working coil 210, on an outer surface thereof.

In case the internal pot 130 is made of a material (e.g., aluminum (Al), copper (Cu) and the like) that has almost no magnetic property or no magnetic property while having high thermal conductivity to improve efficiency of thermal conduction, almost no induced currents or no induced currents may be generated by a magnetic field in the internal pot 130.

In this case, even though the internal pot 130 has high thermal conductivity, heat is not generated in the internal pot 130. Accordingly, the internal pot 130 may include a metallic plate on the outer surface thereof to deliver heat to the internal pot 130.

The metallic plate may be made of a material having a magnetic property. Additionally, the metallic plate may be implemented as a component separate from the internal pot 130 and may be stored in the main body 110. The metallic plate may coat the outer surface of the internal pot 130 through the process of metal spraying and the like. Accordingly, heat may be generated at the metallic plate by a magnetic field and the heat generated at the metallic plate may be delivered to the internal pot 130.

In some implementations, the wireless induction heating cooker 100 may include a plurality of temperature sensors 140 disposed on an outer surface of the internal pot 130. For example, at least three temperature sensors 140 may be arranged on the outer surface of the internal pot 130 along a circumferential direction of the internal pot 130. In some examples, the temperature sensors 140 may be disposed in a virtual plane that is parallel to a bottom surface of the wireless induction heating cooker 100. The plurality of temperature sensors 140 may be in direct surface contact with the outer surface of the internal pot 130.

The temperature sensor 140 may be any contact-type sensor for measuring a temperature of the internal pot 130. For example, the temperature sensor 140 may be implemented as a thermistor, a thermo sensitive ferrite, and the like. Each temperature sensor 140 may include any thermal conduction member made of an elastic material to expand a surface where the temperature sensor 140 contacts the internal pot 130.

The wireless induction heating cooker 100 may include three or more temperature sensors 140. Below, the wireless induction heating cooker 100 having three temperature sensors 140 is described for convenience of description. The three temperature sensors 140 are respectively referred to as a first temperature sensor 140*a*, a second temperature sensor 140*b*, and a third temperature sensor 140*c*.

A circumferential direction of the internal pot 130 is a direction defined along a circumference of the internal pot 130. For example, where the internal pot 130 has a cylinder shape, the circumferential direction may be a direction of a circumference of the cylinder. In another example, where the internal pot has a polyprism shape, the circumferential direction may be a direction of a perimeter of the polyprism. Referring to FIG. 5, at least three temperature sensors 140 may be arranged in parallel along an outer circumferential surface of the cylinder-shaped internal pot 130 in the main body 110.

Below, features of positions of at least three temperature sensors 140 are described.

Referring to FIG. 5, at least three temperature sensors 140 may be arranged on the outer surface of the internal pot 130 such that they are symmetrical to each other. For example, a relative positioning relationship between any one temperature sensor 140 and the rest temperature sensors 140 may be the same as a relative positioning relationship between another temperature sensor 140 and the rest temperature sensors 140. That is, the plurality of temperature sensors 140 may be arranged symmetrically with respect to a reference line extending from a center of the internal pot to one of the plurality of the temperature sensors. For example, the first temperature sensor 140a and the second temperature sensor 140b may be arranged symmetrically with respect to a radial line that extends from a center of a circle around the internal pot 130 to the third temperature sensor 140c.

Referring to FIG. 6, a distance between a central perpendicular line (CL) of the internal pot 130 and each temperature sensor 140a, 140b, 140c may be the same. The temperature sensors 140a, 140b, 140c are arranged in parallel along the circumferential direction of the internal pot 130, and a distance, i.e., D1, between the central perpendicular line (CL) and the first to third temperature sensors 140a, 140b, 140c may be the same.

A distance between the central perpendicular line (CL) and each temperature sensor 140 may be a radial distance in a direction of a normal of the central perpendicular line (CL). In some examples, vertical heights of at least three temperature sensors 140 relative to a bottom surface of the internal pot may be the same. Referring to FIG. 4, a height (a distance in the z-axis direction (see. axes of the coordinate in FIG. 3)) from the bottom surface 110b of the main body 110 to each of the temperature sensors 140 may be the same.

Referring back to FIG. 6, an angle formed between any two temperature sensors 140 adjacent to each other among at least three temperature sensors 140a, 140b, 140c and the central perpendicular line (CL) of the internal pot 130 may be the same. For example, a central angle formed between the adjacent first and second temperature sensors 140a, 140b and the central perpendicular line (CL) may be 8, a central angle formed between the adjacent second and third temperature sensors 140b, 140c and the central perpendicular line (CL) may also be 8, and a central angle formed between the adjacent third and first temperature sensors 140c, 140a and the central perpendicular line (CL) may also be 8.

In some implementations, at least three temperature sensors 140 may be disposed on an outer surface of a round portion or a round area (RA) of the internal pot 130.

Referring to FIG. 7, the internal pot 130 may include a round area (RA) to easily take out a cooked object after an object subject to cooking is cooked. The round area (RA) may be formed at the lower surface of the internal pot 130 within a range from a predetermined first reference radius (R1) to a maximum radius (R2) of the internal pot 130.

As described above, a magnetic field generated in the working coil 210 may generate heat onto a surface of the internal pot 130. In this case, to improve efficiency of heat delivery, a magnetic field generated in the working coil 210 has to be supplied to the outer surface of the internal pot 130 having a wide surface area. Accordingly, each temperature sensor 140 needs to have the smallest volume possible and to be disposed on the outer surface of the internal pot 130.

In case the temperature sensor 140 is disposed at a lateral surface of the internal pot 130 perpendicular to the working coil 210 to maximize efficiency of heating, there are times when a temperature of the internal pot 130 may not be measured based on a height of the temperature sensor 140 and a height of an object subject to cooking. Accordingly, to prevent a reduction in efficiency of heating to a maximum level and to ensure accuracy of measurement of temperatures, each temperature sensor 140 may be disposed on an outer surface of the round area (RA) having a relatively low efficiency of heating.

Referring back to FIG. 7, at the round area (RA), a distance between the internal pot 130 and the working coil 210 becomes longer. Accordingly, an amount of heat that is generated at the round area (RA) by a magnetic field generated in the working coil 210 may be smaller than that at the lower surface of the internal pot 130 in parallel with the working coil 210. In this case, at least three temperature sensors 140a, 140b, 140c, as illustrated in FIG. 8, may be disposed on the outer surface of the round area (RA).

As described above, when each temperature sensor 140 is disposed on the outer surface of the round area (RA) where a relatively small amount of heat is generated, a temperature of the internal pot 130 may be measured without causing a reduction in the entire amount of heat generated in the internal pot 130.

Below, operations of a control module 124 using a measured value of each temperature sensor 140 are described. To describe operations of each of the wireless induction heating cooker 100 and the induction heating apparatus 200, the control module and the communication module included in the wireless induction heating cooker 100 are respectively referred to as a first control module 124 and a first communication module 125, while the control module and the communication module included in the induction heating apparatus 200 are respectively referred to as a second control module 270 and a second communication module 260.

Referring to FIG. 9, the first control module 124 may control an output module including a display module 126 and a speaker module 127, a first communication module 125 and each temperature sensor 140.

The first control module 124 may receive a measured value from each temperature sensor 140. The first control module 124 may determine an alignment state based on a measured value of each temperature sensor 140, and may control the output module such that output module outputs a guide signal based on the alignment state.

The alignment state may denote a state in which the wireless induction heating cooker 100 is disposed on the induction heating apparatus 200, and may be classified as an aligned state and a misaligned state. Specifically, the aligned state may denote a state in which the working coil 210 in the induction heating apparatus 200 and the internal pot 130 in the wireless induction heating cooker 100 are aligned at a predetermined level or higher. The misaligned state may denote a state in which the working coil 210 in the induction heating apparatus 200 and the internal pot 130 in the wireless induction heating cooker 100 are misaligned at a predetermined level or higher. For example, the predetermined level may be a predetermined distance between centers of the wireless induction heating cooker 100 and the induction heating apparatus 200. In some cases, the predetermined level may be a predetermined distance between outer surfaces of the wireless induction heating cooker 100 and the induction heating apparatus 200.

When the wireless induction heating cooker 100 is aligned on the induction heating apparatus 200, a magnetic field generated in the working coil 210 is evenly supplied to the internal pot 130. Accordingly, measured values of the temperature sensors 140 disposed symmetrically at different positions may be the same or similar to each other. For instance, when the wireless induction heating cooker 100 is aligned on the induction heating apparatus 200, centers of the wireless induction heating cooker 100 and the induction heating apparatus 200 may match each other or may be disposed within a predetermined range.

When the wireless induction heating cooker 100 is misaligned on the induction heating apparatus 200, a magnetic field generated in the working coil 210 is unevenly supplied to the internal pot 130. Accordingly, measured values of the temperature sensors 140 disposed at different positions may differ from each other. For instance, when the wireless induction heating cooker 100 is misaligned on the induction heating apparatus 200, centers of the wireless induction heating cooker 100 and the induction heating apparatus 200 may be offset from each other or may be disposed outside a predetermined range.

The first control module 124 may determine an alignment state based on a measured value based on an alignment state of the wireless induction heating cooker 100. For example, the first control module 124 may determine an alignment state based on a difference in measured values of at least three temperature sensors 140.

In some implementations, the first control module 124 may calculate a difference in measured values of the temperature sensors 140, may compare each calculated difference with a predetermined reference value, and may determine an alignment state. The first control module 124 may determine that the alignment state is an aligned state when each difference is within the predetermined reference value, and may determine that the alignment state is a misaligned state when any one of the differences exceeds the predetermined reference value.

Referring to FIG. 11A, as an example, in case where the wireless induction heating cooker 100 is disposed at the center of the working coil 210 (an aligned state), measured values of the first to third temperature sensors 140a, 140b, 140c may be the same or similar. The first control module 124 may calculate a first difference between a measured value of the first temperature sensor 140a and a measured value of the second temperature sensor 140b, a second difference between a measured value of the second temperature sensor 140b and a measured value of the third temperature sensor 140c, and a third difference between a measured value of the third temperature sensor 140c and a measured value of the first temperature sensor 140a.

The first control module 124 may compare the first to third differences with the predetermined reference value, and, when the first to third differences are within the predetermined reference value as a result of comparison, may determine that the alignment state is an aligned state.

Referring to FIG. 10A, as another example, in case the wireless induction heating cooker 100 is disposed out of the center of the working coil 210 (a misaligned state), positions of the first and second temperature sensors 140a, 140b are out of the center of the working coil 210 in the −x-axis direction unlike positions of the first and second temperature sensors 140a, 140b in the above-described aligned state. Accordingly, measured values of the first and second temperature sensors 140a, 140b may be decreased. As the third temperature sensor 140c is moved to the center of the working coil 210, a measured value of the third temperature sensor 140c may be increased.

The first control module 124 may calculate the first to third differences according to the above-described method, and may compare the same with the predetermined reference value. As a result of comparison, the first difference may be within the reference value. However, the second and the third differences may exceed the reference value. In this case, the first control module 124 may determine that the alignment state is a misaligned state.

The present disclosure, as described above, may determine that the wireless induction heating cooker 100 is aligned on the induction heating apparatus 200. As a result, the present disclosure may find out misalignment of the wireless induction heating cooker 100, which deteriorates cooking performance, on its own, without causing the user to recognize the misalignment.

When determining the alignment state, the first control module 124 may control the output module such that the output module outputs a guide signal. The guide signal may be any signal indicating an alignment state of the wireless induction heating cooker 100.

In some implementations, the output module may include a speaker module 127 that is configured to output the guide signal as a sound signal based on control by the control module 124. For example, the guide signal may be output as a mechanical sound that informs the user the wireless induction heating cooker 100 is aligned or misaligned. In addition, the guide signal may be output as a voice that is recorded differently based on an alignment state.

In some examples, the output module may include a display module 126 that is configured to output a guide signal on a screen based on control by the control module 124. For example, the guide signal may be output as a color, a graphical user interface (GUI) or a graphical object, and the like, that may inform the user the wireless induction heating cooker 100 is aligned or misaligned.

The output module may inform the user about an alignment state of the wireless induction heating cooker 100 with respect to the induction heating apparatus 200 to enable the user to realign the wireless induction heating cooker 100, which may help to prevent a deterioration of cooking performance caused by misalignment of the wireless induction heating cooker 100.

The first control module 124 may determine a guide distance and a guide direction based on a difference in values measured by at least three temperature sensors 140 and may control the output module such that the output module outputs a guide signal indicating the guide distance and the guide direction.

The guide distance may denote a distance at which the wireless induction heating cooker 100 is misaligned from the working coil 210, and the guide direction may denote a direction in which the wireless induction heating cooker 100 needs to be moved. That is, the guide distance and the guide direction may be respectively expressed as a size and a distance. Specifically, the guide distance and the guide direction may be expressed as a vector in relation to the x-axis and the y-axis.

Referring back to FIG. 10A, the wireless induction heating cooker 100 may be partially misaligned from the working coil 210 in a −x-axis direction. In this case, the first control module 124 may calculate a first difference that is a difference between a measured value of the first temperature sensor 140a and a measured value of the second temperature sensor 140b, a second difference that is a difference between a measured value of the second temperature sensor 140*b* and a measured value the third temperature sensor 140*c*, and a third difference that is a difference between a measured value of the third temperature sensor 140*c* and a measured value of the first temperature sensor 140*a*.

The first control module 124 may determine a guide distance and a guide direction by comparing the first to third differences. Specifically, the first control module 124 may identify a guide distance and a guide direction corresponding to the first to third differences based on a look-up table (LUT) stored in the memory. Further, the first control module 124 may calculate a guide distance and a guide direction corresponding to the first to third differences using a calculation algorithm stored in the memory.

For example, referring to FIG. 10A, the first control module 124 may determine that a guide distance is 5 cm and that a guide direction is a +x-axis direction. In this case, the first control module 124 may control the display module 126 such that the display module 126 outputs the guide distance and the guide direction on a screen.

The guide distance and the guide direction may be output as a text, a gauge, a graphic user interface (GUI) and the like on the display module 126.

In some implementations, referring to FIG. 10B, the guide direction may be output as an arrow-shaped GUI 126*a*, and a length of the GUI 126*a* may be determined based on the guide distance. Specifically, a direction indicated by the arrow-shaped GUI 126*a* may denote the +x-axis direction where the wireless induction heating cooker 100 has to be moved, and a length of the arrow may be determined in proportion to a distance at which the wireless induction heating cooker 100 is misaligned from the working coil 210.

For instance, when the wireless induction heating cooker 100 is misaligned from the working coil 210 in a −y-axis direction by 10 cm, a direction indicated by the arrow-shaped GUI 126*a* may be a +y-axis direction, and a length of the arrow may be longer than the length in FIG. 10B.

Below, operations of the induction heating apparatus 200 when the first control module 124 in the wireless induction heating cooker 100 determines an alignment state are described.

Referring back to FIG. 9, the induction heating apparatus 200 may include a lighting-emitting module 250, a second communication module 260, and a second control module 270 that controls the lighting-emitting module and the second communication module in addition to the above-described working coil 210. When an alignment state of the wireless induction heating cooker 100 is determined based on the above-described method, the first communication module 125 may transmit alignment information to the second communication module 260 in the induction heating apparatus 200. The alignment information may include information on an alignment state and may also include information on the above-described guide distance and guide direction.

The second control module 270 in the induction heating apparatus 200 may control the light-emitting module 250 such that the lighting-emitting module 250 outputs guide light that indicates the alignment state, based on the alignment information received through the second communication module 260.

The light-emitting module 250 may output light of a predetermined specific color based on an alignment state, and may also output light in a predetermined pattern based on an alignment state.

The light-emitting module 250 may be provided at any position of the induction heating apparatus 200. For example, the light-emitting module 250 may be provided at a front of the induction heating apparatus 200 or may be provided an upper surface of the induction heating apparatus 200 where the working coil 210 is disposed. The light-emitting module 250 may be implemented as any means that may output light, and may be implemented in various forms.

For example, the light-emitting module 250, as illustrated in FIG. 2, may be disposed to surround the working coil 210 on the upper plate 220 of the induction heating apparatus 200. Specifically, the light-emitting module 250 may include a plurality of light-emitting elements 250' arranged along a circumferential direction, and each light-emitting element 250' may be spaced apart from each other at regular intervals in parallel to surround the working coil 210.

Referring back to FIG. 11A, as the wireless induction heating cooker 100 is aligned with the working coil 210, the first control module 124 may determine that the alignment state is an aligned state. Accordingly, the second communication module 260 may receive alignment information including information on the aligned state, and the second control module 270 may control the light-emitting module 250 such that the light-emitting module 250 outputs guide light indicating the aligned state.

Referring to FIG. 11B, in case an alignment state of the wireless induction heating cooker 100 is an aligned state, all the light-emitting elements 250' that constitute the light-emitting module 250 may output light. In case an alignment state of the wireless induction heating cooker 100 is a misaligned state as in FIG. 10A, the light-emitting module 250 may not output guide light.

The present disclosure, as described above, may inform a user about an alignment state of the wireless induction heating cooker 100 with respect to the induction heating apparatus 200, thereby enabling the user to realign the wireless induction heating cooker 100 and preventing a deterioration of cooking performance caused by misalignment of the wireless induction heating cooker 100.

In case the alignment information includes information on a guide distance and a guide direction, the light-emitting module 250 may output guide light based on the guide distance and the guide direction.

Referring back to FIG. 10A, in case an alignment state of the wireless induction heating cooker 100 is a misaligned state, information on a guide distance and a guide direction may be stored in the alignment information that is received through the second communication module 260. In this case, the second control module 270 may control the light-emitting module 250 such that the light-emitting module 250 outputs guide light based on the guide distance and the guide direction. Specifically, the light-emitting module 250 may output predetermined light on the basis the guide distance and the guide direction.

In some examples, the light-emitting module 250 may include a plurality of light-emitting elements 250' as in shown FIGS. 11B. The light-emitting module 250 may output guide light through at least one light-emitting element 250' of the plurality of light-emitting elements 250', which corresponds to the guide direction. For example, the guide light may define a guide light pattern that extends in a radial direction of the working coil. Each light-emitting elements 250' may configured to increase a radial length of the guide light pattern based on an increase of the guide distance (see FIG. 12).

As illustrated in FIG. 11B, the light-emitting elements 250' may be disposed in different directions. Accordingly, a direction where each light-emitting element 250' is disposed may be expressed as a vector in relation to the x-axis and y-axis. A guide distance and a guide direction, as described above, may also be expressed as a vector in relation to the x-axis and y-axis.

As a first example, the light-emitting module 250 may output guide light through any one light-emitting element 250' having a vector the most similar to a vector indicating a guide distance and a guide direction.

When the wireless induction heating cooker 100 is misaligned as illustrated in FIG. 10B, the vector indicating a guide distance and a guide direction may have predetermined magnitude in the +x-axis direction. In this case, the light-emitting module 250 may output guide light through any one light-emitting element 250' disposed in a direction the most similar to the +x-axis direction.

As a second example, the light-emitting module 250 may also output guide light through any one light-emitting element 250' having a vector the most similar to the vector indicating a guide distance and a guide direction and through a plurality of light-emitting elements 250' adjacent to any one light-emitting element 250'.

Referring to FIG. 12, in case the wireless induction heating cooker 100 is misaligned as in FIG. 10B, the light-emitting module may output guide light through any one light-emitting element 250' disposed in a direction the most similar to the +x-axis direction and through a plurality of light-emitting elements 250' adjacent to any one light-emitting element 250'. The number of the plurality of adjacent light-emitting elements 250' may be predetermined.

Additionally, the light-emitting module 250 may adjust a length of guide light based on a guide distance. The guide light may have different lengths depending on an output surface area of the light-emitting element 250'. For example, when each light-emitting element 250' has a predetermined length as in FIG. 11B, a length of guide light may be determined depending on a surface are where the guide light is output.

In some examples, when the guide light is output through any one light-emitting element 250', a length of the guide light may be determined in proportion to a guide distance, i.e., a distance at which the wireless induction heating cooker 100 is misaligned from the working coil 210.

In some examples, when the guide light is output through any one light-emitting element 250' and through a plurality of light-emitting elements 250' adjacent to any one light-emitting element 250', a length of the guide light output by any one light-emitting element 250' may be determined in proportion to a guide distance, and a length of the guide light output by the plurality of light-emitting elements 250' adjacent to any one light-emitting element 250' may be determined such that a length of the guide light is decreased as the plurality of light-emitting elements 250' become far away from any one light-emitting element 250', as in FIG. 12.

The wireless induction heating system, as described above, may inform a user about a direction in which the wireless induction heating cooker 100 is moved and about a distance moved by the wireless induction heating cooker 100 for alignment in case the wireless induction heating cooker 100 is misaligned on the induction heating apparatus 200, thereby enabling the user to easily align the wireless induction heating cooker 100 and significantly improving convenience and usability.

The present disclosure has been described with reference to the implementations illustrated in the drawings. However, the disclosure is not limited to the implementations and the drawings set forth herein. Further, various modifications may be made by one having ordinary skill in the art within the scope of the technical spirit of the disclosure. Further, though not explicitly described during description of the implementations of the disclosure, effects and predictable effects according to the configuration of the disclosure should be included in the scope of the disclosure.

What is claimed is:

1. A wireless induction heating cooker configured to be operated on an induction heating apparatus, the wireless induction heating cooker comprising:
   a main body;
   a lid configured to be coupled to an upper surface of the main body, the lid comprising an output module;
   an internal pot configured to be disposed within the main body;
   a plurality of temperature sensors that are disposed at an outer surface of the internal pot and that are arranged along a circumferential direction of the internal pot; and
   a control module configured to:
      determine an alignment state of the main body relative to the induction heating apparatus based on measured values of the plurality of temperature sensors, and
      control the output module to output a guide signal corresponding to the alignment state.

2. The wireless induction heating cooker of claim 1, wherein the plurality of temperature sensors comprise three or more temperature sensors.

3. The wireless induction heating cooker of claim 1, wherein the lid is hinge-coupled to the main body and configured to open and close the main body, or
   wherein the lid is configured to be attached to and detached from the main body.

4. The wireless induction heating cooker of claim 1, wherein the plurality of temperature sensors are arranged symmetrically with respect to a reference line extending to one of the plurality of the temperature sensors.

5. The wireless induction heating cooker of claim 1, wherein radial distances between a center of the internal pot and the plurality of temperature sensors are equal to one another.

6. The wireless induction heating cooker of claim 1, wherein the internal pot comprises a round portion that extends upward from a bottom surface of internal pot, and
   wherein the plurality of temperature sensors are arranged at an outer surface of the round portion of the internal pot.

7. The wireless induction heating cooker of claim 1, wherein vertical distances between a bottom surface of the internal pot and the plurality of temperature sensors are equal to one another.

8. The wireless induction heating cooker of claim 1, wherein central angles defined about a center of the internal pot between any two adjacent temperature sensors of the plurality of temperature sensors are equal to one another.

9. The wireless induction heating cooker of claim 1, wherein the control module is configured to determine whether the alignment state corresponds to an aligned state or a misaligned state based on a difference in the measured values of the plurality of temperature sensors.

10. The wireless induction heating cooker of claim 1, wherein the control module is configured to control the output module to output the guide signal indicating a guide distance and a guide direction relative to the induction heating apparatus that are determined based on a difference in the measured values of the plurality of temperature sensors.

11. The wireless induction heating cooker of claim 1, wherein the guide signal comprises a sound signal determined by the control module.

12. The wireless induction heating cooker of claim 1, wherein the guide signal comprises screen information determined by the control module.

13. The wireless induction heating cooker of claim 12, wherein the output module is configured to output the screen information comprising a guide distance and a guide direction relative to the induction heating apparatus.

14. The wireless induction heating cooker of claim 13, wherein the guide direction in the screen information comprises an arrow-shaped graphical object having a length determined based on the guide distance.

15. A wireless induction heating system, comprising:
an induction heating apparatus configured to generate a magnetic field through a working coil; and
a wireless induction heating cooker configured to be operated on the induction heating apparatus, the wireless induction heating cooker comprising an internal pot and a plurality of temperature sensors that are arranged on an outer surface of the internal pot along a circumferential direction of the internal pot,
wherein the wireless induction heating cooker is configured to:
determine an alignment state of the wireless induction heating cooker relative to the induction heating apparatus based on measured values of the plurality of temperature sensors, and
transmit alignment information corresponding to the alignment state to the induction heating apparatus, and
wherein the induction heating apparatus comprises a light-emitting module that is configured to output a guide light pattern indicating the alignment state based on the alignment information received from the wireless induction heating cooker.

16. The wireless induction heating system of claim 15, wherein the alignment information comprises a guide distance and a guide direction relative to the induction heating apparatus that are determined based on a difference in the measured values of the plurality of temperature sensors.

17. The wireless induction heating system of claim 15, wherein the alignment information includes a guide distance and a guide direction relative to the induction heating apparatus, and
wherein the light-emitting module is arranged about the working coil and configured to output the guide light pattern corresponding to the guide distance and the guide direction relative to the induction heating apparatus.

18. The wireless induction heating system of claim 17, wherein the light-emitting module comprises a plurality of light-emitting elements that are arranged along a circumferential direction of the working coil, and
wherein the induction heating apparatus is configured to output the guide light pattern through at least one of the plurality of light-emitting elements corresponding to the guide direction.

19. The wireless induction heating system of claim 17, wherein the light-emitting module is configured to adjust a radial length of the guide light pattern based on the guide distance.

20. The wireless induction heating system of claim 19, wherein the light-emitting module is configured to increase the radial length of the guide light pattern based on an increase of the guide distance.

* * * * *